United States Patent

[11] 3,598,425

[72] Inventor Bjerne Sollie
    Jar, Norway
[21] Appl. No. 816,321
[22] Filed Apr. 15, 1969
[45] Patented Aug. 10, 1971
[73] Assignee Wideroe Industri A.S
    Oslo, Norway
[32] Priority Apr. 18, 1968
[33] Norway
[31] 1473/68

[54] WHEELED RACK
    3 Claims, 5 Drawing Figs.
[52] U.S. Cl. .................................................. 280/150 A
[51] Int. Cl. ...................................................... B60v 27/00
[50] Field of Search .......................................... 280/34,
        415, 47.27, 150 A, 79.1; 180/1, 89

[56] References Cited
UNITED STATES PATENTS
1,594,687  8/1926  Pelton ........................ 180/1
3,437,353  4/1969  Cange ......................... 280/415
FOREIGN PATENTS
766,217  3/1954  Great Britain ................ 180/89

Primary Examiner—Leo Friaglia
Assistant Examiner—Robert R. Song
Attorneys—Tourover and Browdy and Browdy and Neimark ABSTRACT: The present invention relates to a wheeled rack for mounting on the side of a trailer for pushing the trailer on edge during stowing, the rack comprising two identical members each having a plurality of rollers and a means for attachment to the frame of the trailer by means of a slidable rod which rigidly secures the frame to the trailer.

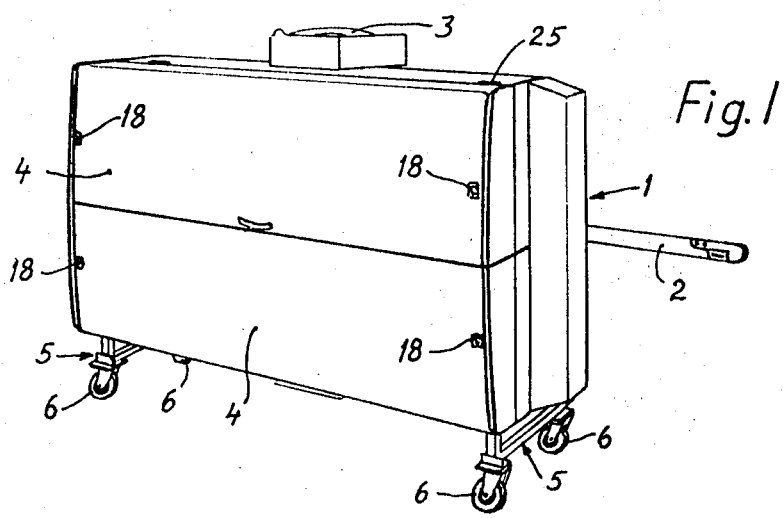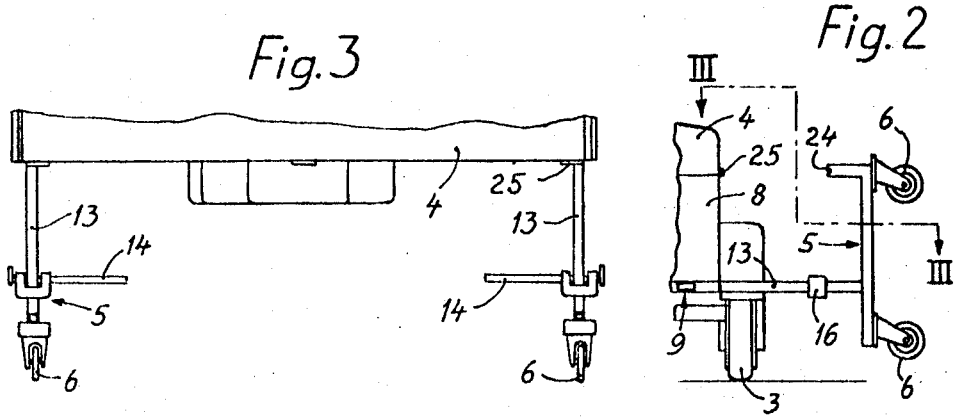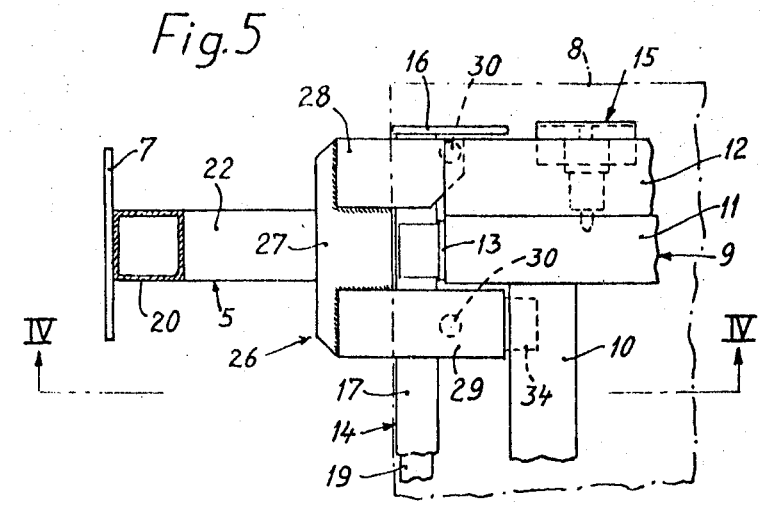

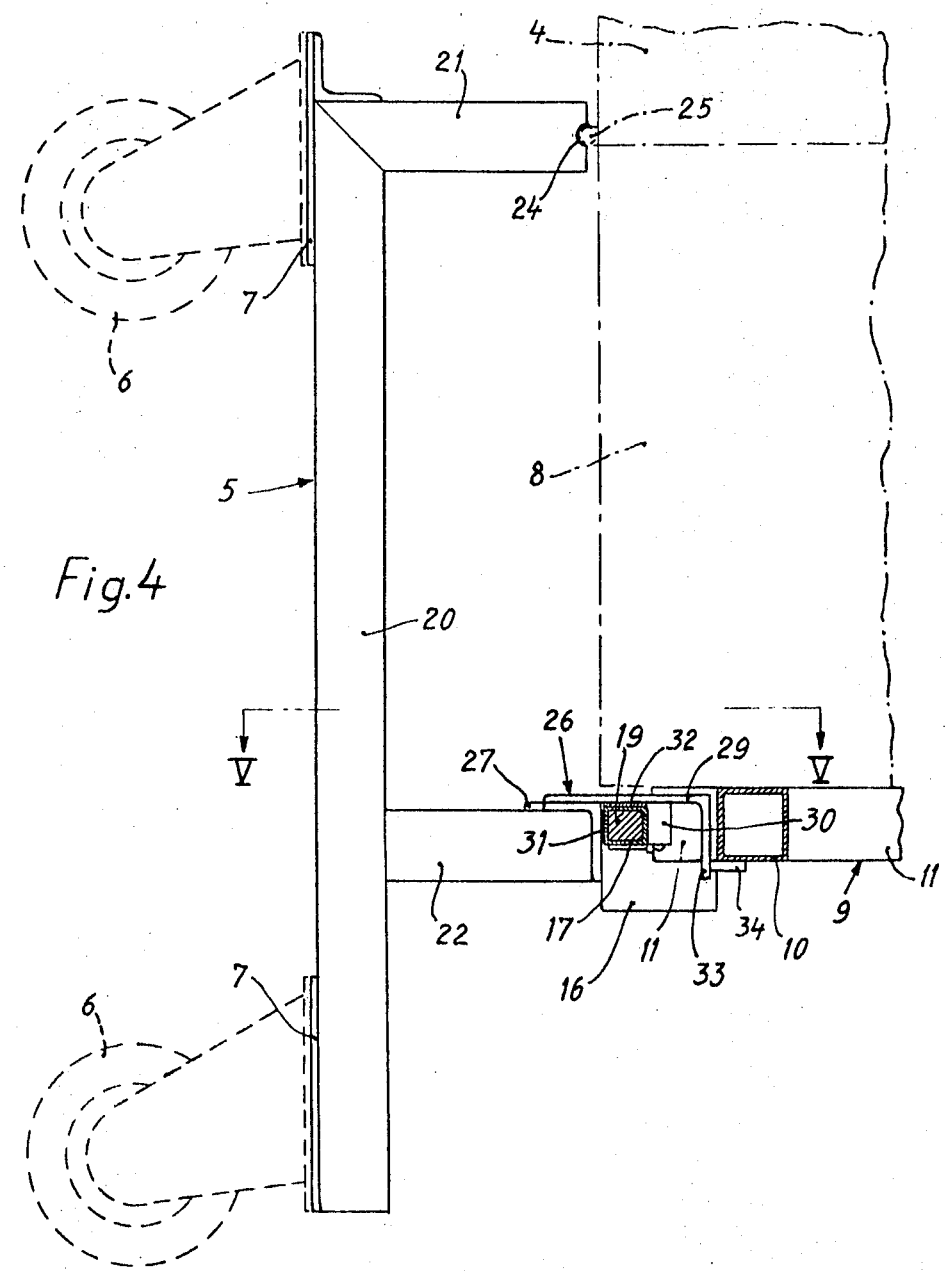

WHEELED RACK

The present invention relates to a wheeled rack for mounting on the side of a trailer for pushing said trailer on edge during stowing. The invention is especially adapted for use in connection with campers that may be folded into a relatively small and compact trailer, as such campers may be stowed away in a garage by using such a wheeled rack without occupying any substantial floor area.

The wheeled rack of the invention requires that the trailer on at least one side has a hollow profile at both ends, each profile extending transversely of the trailer and serving as a guide for a horizontal, slidable rod that may be locked in a position in which it is fully pushed into the profile, the rod at its extremity carrying a support for a pivotal cover of the trailer. Foldable campers corresponding to this description are known. In these campers the slidable rod and the hollow profile are quadratic in cross section. In the folded condition of the camper, the support for the cover extends horizontally. When the camper is unfolded, the rod is pulled out of the profile, turned 90° and again inserted into the profile with the support in a vertical position. The length of the support may be adjustable in order to support the extended cover in the proper position despite irregularities of the ground. For campers of this kind a wheeled rack has been disclosed consisting of two substantially identical members, each including a frame carrying two rollers and comprising a portion for attachment of the frame to the trailer. The attachment portion is constituted by a rod having the same cross section as the slidable rod so as to be insertable into the hollow profile when the rod carrying the support has been removed.

Such a wheeled rack does solve the problem in a satisfactory manner of permitting the camper to be stowed on edge so as to occupy a minimum of space. It has, however, a disadvantage in that the rods carrying the supports for the cover must be removed, and these parts must be stowed separately and thereby may be damaged or mislaid.

The object of the present invention is therefore to provide a wheeled rack that may securely and easily be attached to a trailer of the kind referred to without requiring any parts of the trailer to be removed.

According to the invention this is achieved in that the attachment portion is adapted to grip the support at the extremity of the rod when extended, and further to engage other parts of the trailer when the rod is pushed into its locked position, whereby the slidable rod rigidly secures the frame to the trailer.

A wheeled rack according to the invention will now be described in more detail, reference being had to the drawing, which illustrates a preferred embodiment.

FIG. 1 illustrates a folded trailing camper standing on edge on a wheeled rack according to the invention;

FIG. 2 illustrates one side of the trailer during mounting of the wheeled rack;

FIG. 3 is a top view of the said one side of the trailer, partly in section taken along the line III—III in FIG. 2;

FIG. 4 is a side view of one of the frame members of a wheeled rack according to the invention in a position in which the frame member engages the support and a further profile of the trailer chassis and bears against the hinge of the trailer cover; and FIG. 5 is a fragmentary view of the chassis of the trailer with the frame member mounted, viewed along the line V—V in FIG. 4.

FIG. 1 illustrates a folded trailing camper 1, having a connecting rod 2, road wheels 3 and two pivotal covers that are hinged at 25 along the sides of the trailer. In FIG. 1 the tailer 1 is illustrated on edge, a wheeled rack consisting of two frames 5, each carrying two rollers 6, being mounted on one side of the trailer. The trailer 1 may be pushed on the rollers 6 by hand for stowing of the trailer in a garage for example.

The frame 5 is illustrated in more detail in FIGS. 4 and 5.

As shown in FIG. 4 the frame is F-shaped. The frame may be welded from hollow rectangular profiles, e.g. aluminum profiles. At each end of the frame there is provided a plate 7 serving as an attachment portion for the rollers 6, which are not illustrated in FIG. 5 and are only indicated in broken lines in FIG. 4. The body 8 of the trailer, which in FIGS. 4 and 5 is merely illustrated by dot-dash lines, is carried by a chassis 9 comprising longitudinally and transversely extending hollow profiles 10 and 11 respectively, and an angle bar 12 extending along the hollow profile 11. The end of the profile 11 is open, said profile serving as a guide for a horizontal slidable rod 13, which at its extremity carries a support assembly shown generally as 14 for the cover 4 in the unfolded condition thereof. When the camper 1 is in unfolded condition and is to be hauled by a vehicle it is intended that the support assembly 14 should be in a horizontal position as best illustrated in FIGS. 3 and 5. The rod 13 may then be locked in a position in which it is fully pushed into the profile and in which the support assembly 14 is positioned below the body of the trailer. The locking is effected by a device that is diagrammatically illustrated at 15 in FIG. 5. When the support assembly 14 is to be used to support a cover 4, the locking device 15 is suspended, whereupon the rod 13 is pulled out of the profile 10, turned 90° about its longitudinal axis and again inserted into the profile, however this time with the support assembly 14 in a vertical position. At one end the support assembly 14 carries a plate 16 adapted to rest on the ground and in this situation the assembly serves as a jack, or prop, as will be more obvious hereinafter. The support 14 is telescopic, the support consisting of an outer tube 17 which is rigidly welded to rod 13 and extends at right angles to the rod to form essentially a T-configuration and an inner rod 19 to which the plate 16 is attached inner rod 19 being displaceable within the outer tube 17 and lockable in any desired position dependent on the level of the ground. From the above description then, it should be clear that when support assembly 14 is used to support cover 4, in its open state, the assembly functions as a prop to hold the cover level with the ground. The slidable rod 13 is inserted in the profile 11 so that tube 17, welded to rod 13, extends vertically permitting inner rod 19 which telescopes into tube 17, to be extended until plate 16 which is welded to the outer end of rod 19 contacts the ground. At this point outer tube 17 and inner rod 19 are locked together.

As previously stated the frame is F-shaped, such frame consisting of a hollow rod 20 having two perpendicularly protruding rod portions 21 and 22 respectively. The rod portion 22 carries a device adapted to grip the support 14 and engage the chassis 9 of the trailer in such a way that the frame 5 is rigidly secured to the trailer when the rod 13 is locked by the locking device 15 in the fully inserted position of the rod. At the end of the rod portion 21 there is provided a rest 24 for a hinge 25 of the cover 4. When the frame 5 engages the support 14 and the latter is pushed fully into locked position below the body 8, the rest 24 is forced firmly against the hinge 25, whereby the frame 5 is rigidly and securely attached to the trailer.

The means of the rod portion 22 adapted to grip the support 14 and engage the chassis 9 primarily consist of a structure 26 that in plan is U-shaped, the yoke of the structure being constituted by an angle bar 27 welded to the end of the rod portion 22. The two legs 28 and 29 of the structure 26 extend above and beyond the horizontal support 14, and each leg carries a depending pin 30 spaced such a distance from the angle bar 27 that the support 14 will be a narrow fit between each pin 30 and a yielding cushion 31 attached to the angle bar 27 opposite each pin 30. A similar yielding cushion 32 is also attached to the underside of the legs 28 and 29, and the pin 30 is covered by a sleeve of plastic material in order to protect the support from damage when the U-structure 26 is pressed down over the support with one leg 28 and 29 respectively on either side of the connection between the support and the slidable rod 13 as illustrated in FIG. 5.

The U-structure 26 is pressed down on the support 14 in a position in which the rod 13 is pulled a short distance outwardly in the guide 11. The rod 13 is then pushed into its locking position. In this position the leg 28 of the U-structure 26 will lie below one leg of the angle bar 12. At the extremity of the leg 29 there is provided a depending portion 33 carrying a tongue 34 that engages the hollow profile 10 on the underside thereof when the rod 13 is pushed into locking position. Because the leg 28 and the tongue 34 of the leg 29 protrude below the angle bar 12 and the hollow profile 10 respectively, the frame 5 cannot be taken off from the support 14 when the rod 13 is pushed into locking position.

It will thus be seen that the invention provides a wheeled rack for the purpose stated, in which the rod 13 carrying the support 14 cannot be removed when the wheeled rack is mounted, but on the contrary is used to provide a reliable securing of the wheeled rack to the trailer.

What I claim is:

1. A wheeled rack for mounting on the side of a trailer for supporting and moving said trailer on edge during stowing comprising
    a hollow profile extending transversely across each end of the trailer and forming a part thereof, said profile serving as a horizontal guide;
    a slidable rod for insertion into said profile;
    locking means for securing said rod to said profile when the rod has been fully pushed into said profile;
    a support assembly integrally attached to said rod near its outer extremity for supporting a pivotal cover of the trailer;
    a rack for each end of the trailer;
    a plurality of rollers mounted on each rack;
    an attachment portion integrally attached to each rack; and
    gripping means on the attachment portion for gripping the support where the rod is extended and for engaging said hollow profile when the rod is pushed into its locked position, whereby the rod rigidly secures the frame to the trailer.

2. A wheeled rack in accordance with claim 1 wherein each said frame is F-shaped comprising an elongated member having two perpendicularly protruding portions, one of said perpendicularly protruding portions carrying said attachment portion.

3. A wheeled rack in accordance with claim 2 wherein the other of said perpendicularly protruding portions has a rest at the end thereof adapted to engage a hinge of said pivotal cover.